(12) United States Patent
Brunswig et al.

(10) Patent No.: US 7,770,146 B2
(45) Date of Patent: Aug. 3, 2010

(54) COMPUTER SOFTWARE DEVELOPMENT INCORPORATING CORE AND COMPOUND SERVICES

(75) Inventors: Frank Brunswig, Heidelberg (DE); Thomas Fiedler, Pfintzal (DE); Oliver Goetz, Altrip (DE); Stefan Rau, Dielheim (DE); Stefan Wenneker, Eppingen-Eisenz (DE); Volker Wiechers, Heidelberg (DE)

(73) Assignee: SAP AG, Walldorf (DE)

( * ) Notice: Subject to any disclaimer, the term of this patent is extended or adjusted under 35 U.S.C. 154(b) by 948 days.

(21) Appl. No.: 11/436,613

(22) Filed: May 19, 2006

(65) Prior Publication Data
US 2007/0288508 A1 Dec. 13, 2007

(51) Int. Cl.
*G06F 9/44* (2006.01)
*G06F 9/45* (2006.01)

(52) U.S. Cl. ..................................................... 717/104

(58) Field of Classification Search ......... 717/104–110, 717/120–123
See application file for complete search history.

(56) References Cited

U.S. PATENT DOCUMENTS

| | | | | |
|---|---|---|---|---|
| 5,875,330 A * | 2/1999 | Goti | ........................... | 717/104 |
| 6,011,917 A * | 1/2000 | Leymann et al. | ............. | 717/104 |
| 6,028,997 A * | 2/2000 | Leymann et al. | ............. | 717/104 |
| 6,199,195 B1 * | 3/2001 | Goodwin et al. | ............. | 717/104 |
| 6,366,922 B1 * | 4/2002 | Althoff | .................... | 707/103 R |
| 6,601,234 B1 * | 7/2003 | Bowman-Amuah | ......... | 717/108 |
| 6,678,882 B1 * | 1/2004 | Hurley et al. | ................ | 717/121 |
| 6,839,724 B2 * | 1/2005 | Manchanda et al. | ......... | 707/203 |
| 7,000,219 B2 * | 2/2006 | Barrett et al. | ................. | 717/107 |
| 7,028,288 B2 * | 4/2006 | Wall et al. | .................... | 717/109 |
| 7,293,254 B2 * | 11/2007 | Bloesch et al. | ............... | 717/108 |
| 7,320,120 B2 * | 1/2008 | Rajarajan et al. | ............ | 717/104 |
| 7,334,216 B2 * | 2/2008 | Molina-Moreno et al. | .. | 717/109 |
| 7,424,701 B2 * | 9/2008 | Kendall et al. | ............... | 717/105 |
| 7,463,263 B2 * | 12/2008 | Gilboa | ....................... | 345/440 |
| 7,480,897 B2 * | 1/2009 | Reinhardt et al. | ............ | 717/120 |
| 7,506,303 B2 * | 3/2009 | Gupta et al. | ................. | 717/104 |
| 7,657,898 B2 * | 2/2010 | Sadiq | .......................... | 719/330 |
| 2002/0174169 A1 | 11/2002 | Schmid et al. | | |
| 2005/0066338 A1 | 3/2005 | Bloesch et al. | | |

OTHER PUBLICATIONS

Evermann, "A meta level specification and profile for aspectJ in UML", ACM AOM, pp. 21-27, 2007.*
Baroni, "Quantitative assessment of UML dynamic models", ACM ESEC, pp. 3336-3369, 2005.*
Ikoma et al, "Using a validation model to measure the agility of software development in a large software development organization", IEEE ICSE, pp. 91-100, 2009.*

(Continued)

*Primary Examiner*—Anil Khatri
(74) *Attorney, Agent, or Firm*—Mintz, Levin, Cohn, Ferris, Glovsky & Popeo, P.C.

(57) ABSTRACT

A method is provided for providing one or more services by a service provider to a service consumer. The method may include defining a meta-model describing at least one core service and at least one compound service; creating a model for the core service based on the meta-model; and implementing the core service on the service provider based on the model. The method may also include implementing the compound service on the service provider and implementing a generic access interface on the service consumer to dynamically access the core service and the compound service.

14 Claims, 7 Drawing Sheets

OTHER PUBLICATIONS

Coulson et al, "A generic component model for building systems software", ACM Trans. On Comput. Sys. vo. 26, No. 1, article 1, pp. 1-42, 2008.*

Nascimento et al, "MDA based approach for embaded software generation form a UML/MOF repository", ACM SBCCI, pp. 143-148, 2006.*

Alti et al, "An automatic transformation from COSA software architecture to CORBA platform", ACM NOTERE, pp. 246-256, 2008.*

Gokhale, et al., "The Performance of the COBRA Dynamic Invocation Interface and Dynamic Skeleton Interface Over High-Speed ATM Networks", Global Telecommunications Conference, pp. 50-56 (1996).

Curbera, et al., "Unraveling the Web Services Web: An Introduction to SOAP, WSDS, and UDDI", IEEE Internet Computing, 6(2): pp. 86-93 (2002).

Schmidt et al., "Object Interconnections: Collocation Optimizations for COBRA" (online), pp. 1-7. Retrieved from the Internet:<URL:http://www.iona.com/hyplan/vinoski/col18.pdf>, [Retrieved on Apr. 18, 2007].

Vandervelpen, et al., "Location-Transparent User Interaction for Heterogenous Environments", Proceedings of HCI International (online), pp. 313-317. Retrieved from the Internet: <URL:http//research.edm.uhasselt.be/{kris/research/publications/hcii2003/HCII2003_Vandervelpen_luyten.pdf>, [Retrieved on Oct. 29, 2007].

* cited by examiner

COMPUTER SOFTWARE DEVELOPMENT INCORPORATING CORE AND COMPOUND SERVICES

TECHNICAL FIELD

The present invention generally relates to the field of computer application software architectures and, more particularly, to methods and systems providing model driven service oriented software architectures.

BACKGROUND

Computer software programs or applications are often developed to solve a particular set of problems within a predetermined environment. However, new kinds of problems and changes in the predetermined environment often require modifications or updates of the computer software programs or applications. When complex software programs or applications are involved, the changes or updates often take a long time and a large amount of effort to complete. Software models may be used to accommodate these changes or updates and to reduce the amount of effort or time to complete the changes or updates. For example, U.S. Patent Application Publication No. 2005/0066338 to Bloesch et al. on Mar. 24, 2005, discloses an application programming interface and framework that supports a meta-object model for application design and operating system interactions. However, such operating system interaction techniques are often ineffective when dealing with large sale network computing applications.

Among network based software applications, enterprise service software applications may be developed for an enterprise environment with stable connections, high bandwidth, and business oriented applications. The enterprise service software are often implemented in a transactional and/or stateful manner, and may also implemented with a fine granularity in term of functionalities. On the other hand, general web service software applications may be developed for regular Internet-based applications in a network computing environment where different computers and different network connections are interconnected and the status of the environment may often be unpredictable. Thus, the general web service software is often implemented in a non-transactional and/or stateless manner, and may also be implemented with a significantly large granularity in terms of functionalities.

Because the above differences, enterprise service software applications and web service software applications are often not compatible with each other. That is, enterprise services and web services cannot be accessed by a single software framework without significant changes to the enterprise service software applications and/or the web service software applications. Conventional attempts to access both enterprise services and web services may often use extra adaptation layers and extra out-of-band data (e.g., cookies, etc.) that need to be handled by a specific service.

However, such extra software components used by the conventional techniques often require significant amount of software implementations before a new service may be provided. In certain circumstances, it may be undesirable or impractical to create such software implementations before providing a new service or services.

Methods and systems consistent with certain features of the disclosed embodiments are directed to solving one or more of the problems set forth above.

SUMMARY

One aspect of the present invention includes a method for providing one or more services by a service provider to a service consumer. The method may include defining a meta-model describing at least one core service and at least one compound service; creating a model for the core service based on the meta-model; and implementing the core service on the service provider based on the model. The method may also include implementing the compound service on the service provider and implementing a generic access interface on the service consumer to dynamically access the core service and the compound service.

Another aspect of the present invention includes a method for a service consumer accessing services provided by a service provider. The method may include obtaining a service request by the service consumer to request a service provided by the service provider while the service consumer may include a generic access interface and a model access interface. The method may also include determining whether the service requested is a core service or a compound service, and determining, if the service is a core service, whether the model access interface is available for accessing the core service. Further, the method may include selecting the model access interface for accessing the service provided by the service provider if the service is a core service and the model access interface is available.

DETAILED DESCRIPTION

Reference will now be made in detail to exemplary embodiments, which are illustrated in the accompanying drawings. The same reference numbers may be used throughout the drawings to refer to the same or like parts.

Figure 1:
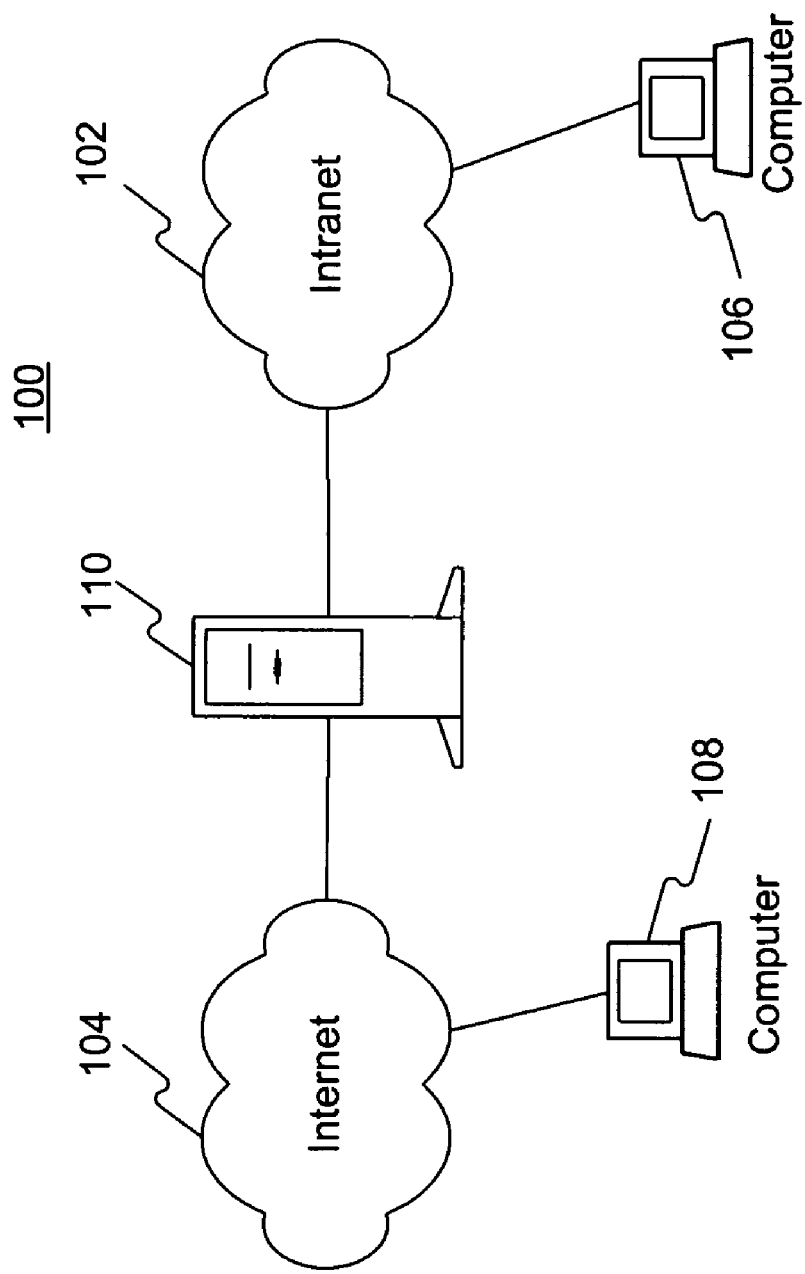
FIG. 1 illustrates a block diagram of an operational environment consistent with certain disclosed embodiments.

FIG. 1 illustrates an exemplary operational environment 100 having computer systems that incorporate certain embodiments of the present invention. Operational environment 100 may include computer systems interconnected by communication networks and computer software programs provided to carry certain services. Operational environment 100 may include an intranet 102, a service provider computer 106 ("provider 106") connected to intranet 102, Internet 104, a service consumer computer 108 ("consumer 108") connected to Internet 104, and a gateway 110 interfacing both intranet 102 and Internet 104 to provide network gateway functions, such as security, protocol translation, addressing, etc.

Intranet 102 may include a private network consisting one or more network segments with restricted network access, such as a computer network that associated with an organization or a business entity designed to be accessible by members and/or customers with proper authorizations. Provider 106 may be used to host and/or implement certain services provided by the business entity. Although only one service provider computer is shown in FIG. 1, any number of service provider computers may be included and the services may be distributed over multiple service provider computers.

Internet 104 may include any public accessible network or networks interconnected via transmission control protocol/internet protocol (TCP/IP) or any other appropriate types of network protocols. Internet 104 may be generally considered separated from intranet 102 but may be connected to intranet 102 via gateway 110. Consumer 108 may access provider 106 through Internet 104 and intranet 102 to request services provided by provider 106. Although FIG. 1 only shows only one service consumer computer connected to Internet 104, any number of service consumer computers may be included. Further, multiple service consumer computers may access provider 106 simultaneously.

Figure 2:
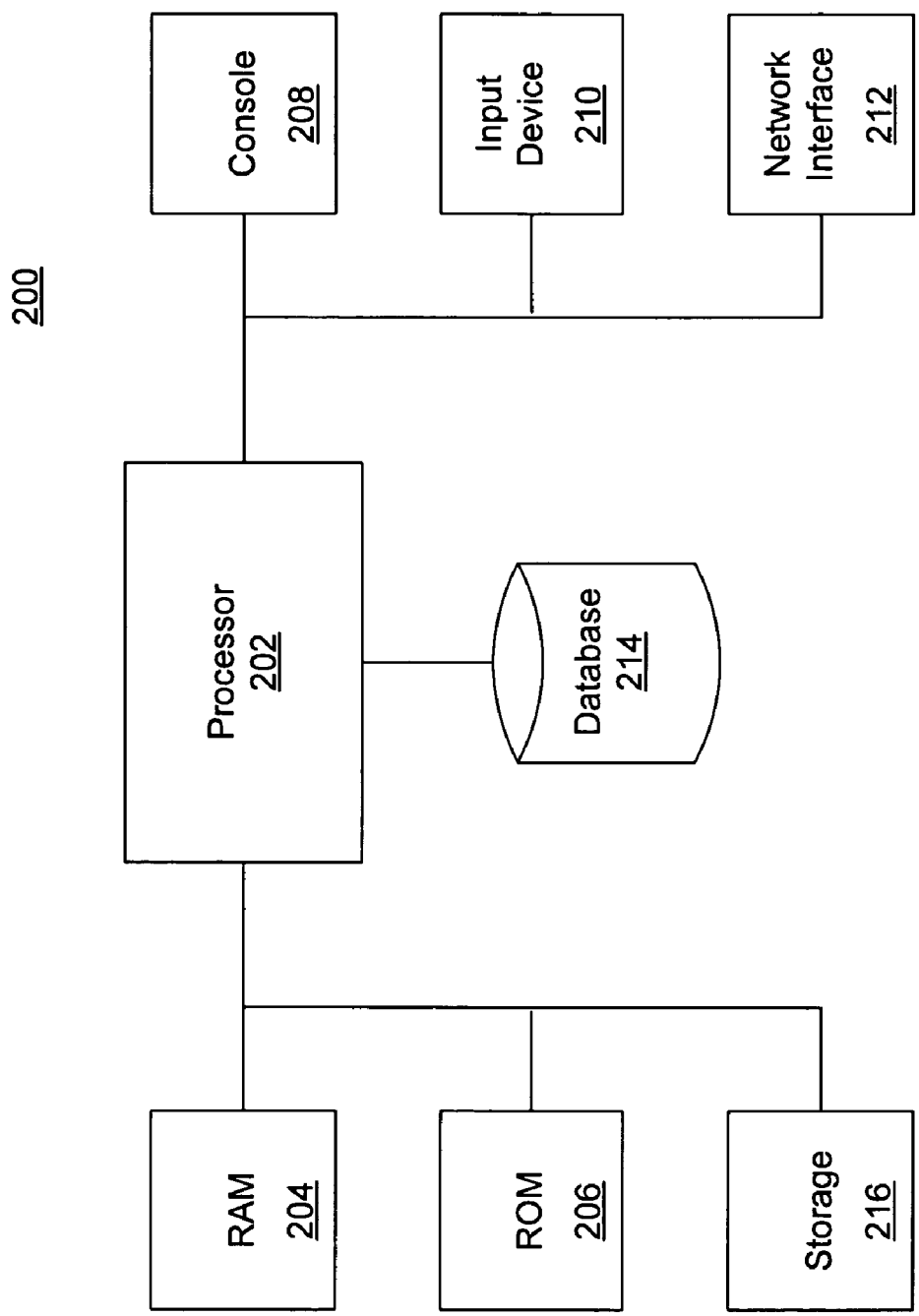
FIG. 2 illustrates a block diagram of a computer system consistent with certain disclosed embodiments.

Provider 106 and/or consumer 108 may include any appropriate types of computer systems. FIG. 2 shows a functional block diagram of an exemplary computer system 200 that may be configured as provider 106 and/or consumer 108 to carry out functionalities of provider 106 and/or consumer 108, such as computer software applications associated with provider and/or consumer functions. In addition, computer system 200 may also be configured as a computer platform to design and implement the computer software applications implemented by provider 106 and/or consumer 108. A computer software application may be implemented, or created, based upon abstract descriptions included in, for example, design documents and/or various models.

As shown in FIG. 2, computer system 200 may include a processor 202, a random access memory (RAM) 204, a read-only memory (ROM) 206, a console 208, an input device 210, a network interface 212, a database 214, and a storage 216. It is understood that the type and number of listed devices are exemplary only and not intended to be limiting. The number of listed devices may be changed and other devices may be added.

Processor 202 may include any appropriate type of general purpose microprocessor, digital signal processor, or microcontroller. Processor 202 may execute sequences of computer program instructions to perform various functions as explained above. Processor 202 may be coupled to, or access other devices, such as RAM 204, ROM 206, console 208, input device 210, network interface 212, database 214, and/or storage 216, to execute computer program instructions and/or program data.

The computer program instructions may be loaded into RAM 204 for execution by processor 202 from read-only memory (ROM) 206 and/or storage 216. Storage 216 may include any appropriate type of mass storage provided to store any type of information that processor 202 may need to perform computer implemented processes. For example, storage 216 may include one or more hard disk devices, optical disk devices, or other types of storage devices.

Console 208 may provide a graphic user interface (GUI) or other types of user interfaces to display information to users of computer system 200. Console 208 may include any appropriate type of computer display device or computer monitor.

Input device 210 may be provided for users to input information into computer system 200. Input device 210 may include a keyboard, a mouse, or other optical or wireless computer input device, etc.

Network interface 212 may provide communication connections such that computer system 200 may be accessed remotely through intranet 102 and/or Internet 104. Database 214 may contain any information used by processor 202. Database 214 may include any type of commercial or customized database. Database 214 may also include analysis tools for analyzing the information in the database.

Figure 3:
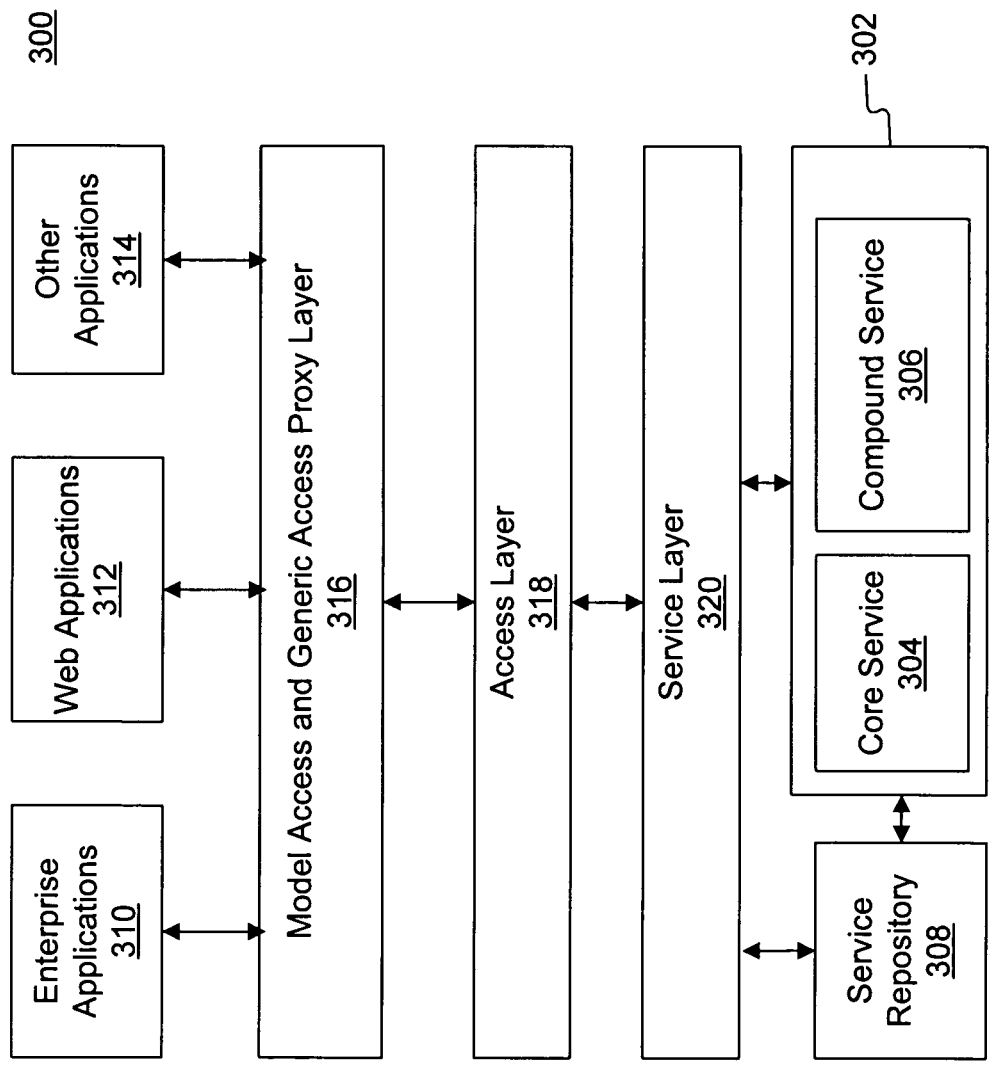
FIG. 3 illustrates a block diagram of an exemplary software architecture consistent with certain disclosed embodiments.

Processor 202 may execute certain software programs to implement a software framework to provide services in operational environment 100. FIG. 3 shows an exemplary software architecture of the software framework.

As shown in FIG. 3, software architecture 300 may include a service implementation layer 302, a service repository 308, a service layer 320, an access layer 318, a model access and generic access proxy layer 316, enterprise applications 310, web applications 312, other applications 314, etc. Further, service implementation layer 302 may include a core service 304 and a compound service 306. The numbers of software components are exemplary only and not intended to be limiting. Any number of software components may be implemented by software architecture 300.

Service implementation layer 302 may include any appropriate type of service provided by a service provider (e.g., provider 106). A service may refer to a function that is pre-defined, self-contained, and/or independent from particular types of software platforms and/or from contexts or states of other functions. A service may be accessed through a service interface. A software entity providing the service or a computer platform on which the software entity provides the service may be referred to as a service provider, and a software entity requesting the service or a computer platform on which the software entity request the service may be referred to as a service consumer. A service provider may also be a service consumer under certain circumstances. Further, in a network computing environment (e.g., operational environment 100) where software entities may communicate with each other via various types of connections (e.g., network connections or logical connections, etc.), a service may also be referred to as an endpoint of a connection for exchanging information. Different services may also exchange information through these connections.

Service implementation layer 302 may be configured to include multiple different types of services. These services may be organized as a collection of services with operations defined through corresponding service interfaces. Software architecture 300 may be designed and/or configured to provide these services via service implementation layer 302 allowing access to these services by various applications, and/or managing communications between the services. As such, software architecture 300 may be referred to as a service-oriented architecture providing solutions in terms of services and their interconnections.

Software architecture 300 may be configured to use software modeling tools to define and organize the services to be provided by service implementation layer 302. By using the software modeling tools, such as unified modeling language (UML), etc., the services may be organized based a set of models. Series of transformations may be imposed between the models to implement the services. Such transformations, such as model mapping, model conversion, and/or code generation, etc., may be performed automatically by the software modeling tools or performed manually by users, such as software developers. Therefore, software architecture 300 may also be referred to as a model driven service-oriented architecture.

The models that define services (i.e., service specific models) provided by service implementation layer 302 may be described in meta-models. A meta-model may generally refer to a model describing a language, such as unified modeling language (UML), from which models can be expressed. That is, the meta-model may include building blocks for creating various service specific models such as business models, medical models, warehouse model, etc. For illustrative purposes, a service specific model described by a meta-model may be referred to as a concrete meta-model, or simply a model, to indicate that the service specific model is defined using a particular meta-model and may be subject to certain transformations available to the meta-model. For example, concrete meta-models may be represented by meta-data, which may be transferred or accessed using certain data exchange standards, such as XML metadata interchange (XMI), etc.

As explained above, service implementation layer 302 may include different types of services. In certain embodiments, service implementation layer 302 may include a core service 304 and a compound service 306. Other types of services, however, may also be used.

A core service may refer to a service supporting a fine granularity of operations that can be individually accessed. The granularity of an operation may refer to the scope or range of attributes of the service to be accessed by the operation. A fine granularity of operations may allow a portion of the attributes or an individual attribute to be accessed or manipulated by a single operation. A core service may include a large number of attributes that may be individually accessed by different operations. Further, a core service may be stateful in that the runtime state of the core service may be kept during operations of the core service. For example, a core service may include a query interface to provide the status of an individual attribute or change properties of individual properties. Core service 304 may include any appropriate type of implementation of a particular core service (i.e., back-end implementation of the particular core service) and may also include state information related to that service.

For example, core service 304 may include a purchase order created during a business transaction. The core service purchase order may include attributes associated with customer information (e.g., customer name, address, phone number, etc.), order information (e.g., order number, date, location, etc.), and item information (e.g., stock number, price, location, etc.). Further, header information may be included in the purchase order to provide an index for accessing the information. Also, a note may also be included to record any textual messages.

Further, the core service purchase order may allow a service consumer to access certain attributes individually without accessing other attributes. For example, the service consumer may access customer information without accessing order information. Alternatively, the service consumer may access only customer name only. The amount of data exchanged between the service consumer and the service provider may be limited to only the requested information. In addition, as explained, the state information of the software execution of core service 304 may be maintained by a service provider of core service 304.

A compound service may refer to a service supporting a large granularity of operations compared to a core service. A large granularity of operations may allow a large portion of the attributes or all of the attributes to be accessed or manipulated by a single operation. A compound service may thus include a limited number of operations to access service attributes in an entirety or in a large group. Further, a compound service may be configured such that it is prevented from individually accessing the service attributes and may be configured to access all or a set of attributes. Such large granularity may involve a large amount of data to be exchanged in a single operation. Also, the state information of a compound service often is not maintained during operations of the compound service. Compound service 306 may include any appropriate type of implementation of a particular compound service (i.e., back-end implementation of the particular compound service).

Following the above example of the purchase order, compound service 308 may also include a purchase order service. However, the compound service purchase order may only provide limited interfaces that may require a service consumer to access all attributes in a single access, which may result in a large amount of data being transferred between the service provider and the service consumer. In addition, compound service 306 may be stateless. That is, the service provider may be unable to maintain the state information of the software execution of compound service 306.

Service implementation layer 302, or the back-end implementations of core service 304 and compound service 306, may be implemented on any appropriate type of computer hardware platform or software platform based on the models defining core service 304 and compound service 306. In one embodiment, the services included in service implementation layer 302 may be implemented on multiple hardware and/or software platforms.

As explained above, a meta-model may be used to define service specific models. In certain embodiments, a unified meta-model may be provided to define both core service 304 and compound service 306. That is, complete descriptions of core service 304 and compound service 306 may be included in the unified meta-model, such as enterprise services definition language (ESDL). Concrete meta-models of particular services of core service 304 and compound service 306 may be defined using the unified meta-model, such as a business object model or a purchase order model, etc. The meta-model and concrete meta-models of core service 304 and compound service 306 may be stored in service repository 308. Therefore, service repository 308 may also include various metadata describing services provided by service implementation layer 302 and interfaces for defining and accessing the metadata.

Because the unified meta-model may describe a complete list of service interfaces of both core service 304 and compound service 306, definitions common to both core service 304 and compound service 306 may be defined and used for both core service 304 and compound service 306. Definitions not common to core service 304 and compound service 306, on the other hand, may be included separately in the unified meta-model.

In the purchase order example above, the core service purchase order (e.g., core service 304) may be described by a business object meta-model under the unified meta-model. The business object meta-model may include interface, operations, and types. An interface may be provided for interacting with the service and may be defined by interface patterns (i.e., pre-defined abstract definitions of the interactions). For example, interface patterns may include query, access, action, transaction, message, dynamic property, change notification, and/or value help, etc. Further, dynamic property of the business object meta-model may include any appropriate run-time properties, such as enabled/disabled, mandatory, de-activated, read-only, create-enabled, update-enabled, and/or delete-enabled, etc.

The core service purchase order meta-model may include various operations for a service consumer to access the purchase order in core service 304. For example, the core service purchase order meta-model may include a "read header" operation to read the header information of the purchase order, a "find item" operation to search for a particular item in the purchase order, a "navigate" operation to search for indexing information in the purchase order (e.g., header information), and/or a "retrieve by association" operation to get related information, etc. The above described operations are exemplary only and not intended to be limiting, and other operations may also be included.

Further, compound service purchase order meta-model may also be defined under the unified meta-model. For example, the unified meta-model may include a compound service operation, or operations, such as a "read data" operation to retrieve all information in the purchase order in one operation.

In certain embodiments, when the unified meta-model describes interfaces of both core service 304 and compound service 306, the unified meta-model may include separate interfaces for core service 304 and compound service 306. In certain other embodiments, the unified meta-model may include common interfaces for both core service 304 and compound service 306. Extra constraints may be added to interface patterns representing the common interfaces to provide additional information describing, for example, the type of service to be accessed, etc. Extra constraints may also be added to interface patterns of core service 304. If core service 304 is accessed via interfaces of compound service 306, the extra constraints may allow the access with degraded performance, such as a slower speed and/or with lower efficiency, etc.

It should be noted that the business object meta-model defining the exemplary purchase order is only for illustrative purposes. Service repository 308 may include any other enterprise related concrete meta-model defined under the unified meta-model. For example, service repository 308 may include a business information meta-model for business warehouse and online analytical process (OLAP), etc., for both core service 304 and compound service 306.

After concrete meta-models are defined under the unified meta-model and meta-data is generated and stored in service repository 308, core service 304 and compound service 306 may be accessed by software applications through service layer 320. Service layer 320 may also be created based on concrete meta-models and the unified meta-model. Service layer 320 may act as a broker for service implementation layer 302 (e.g., core service 304, compound service 306, etc.) and service repository 308. For example, service layer 320 may use the additional information provided in the extra constraints in the interface patterns to determine whether a service request is intended for core service 304 or compound service 306. Service layer 320 may also respond to certain requests to access service repository 308 for identifying available services.

Service layer 320, service implementation layer 302, and repository 308 may be implemented by a service provider (e.g., provider 106) to provide services. Service consumers may access services by sending service request messages to the service provider, and by receiving returned response messages from the service provider. In practice, service consumers may access services by using certain client software applications, such as enterprise applications 310, web applications 312, and other applications 314, etc.

Enterprise applications 310 may include any appropriate types of software applications designed to access core service 304, and web applications 312 may include any appropriate types of software applications designed to access compound service 306. Other applications 314, on the other hand, may include any appropriate type of third party software applications independently designed to access general services according to a certain common standard without knowledge of particular structures of software architecture 300. All of enterprise applications 310, web applications 312, and other applications 314 may access service implementation layer 302 through model access and generic access proxy layer 316.

Model access and generic access proxy layer 316 may include any software programs that facilitate or provide access to service implementation layer 302. For example, model access and generic access proxy layer 316 may provide a generic interface for accessing any services provided by service implementation layer 302. The generic interface may be used to dynamically look up available service providers and retrieve interfaces and/or operations of services provided by the available service providers. The retrieved interfaces and/or operations may then be used to access the services. The generic access may be used by any of enterprise applications 310, web applications 312, and other applications 314 to access either core service 304 or compound service 306.

On the other hand, model access and generic access proxy layer 316 may provide a model access interface for accessing any services provided by service implementation layer 302. The model access interface may include any appropriate type of interface to access a particular concrete meta-model. The model access interface may be derived from the concrete meta-model and may correspond to a particular meta-model class, such as a business object meta-model, etc. Because the particular concrete meta-model is pre-defined and well-documented, interfaces of the concrete meta-model may be known to software applications (e.g., enterprise applications 310), and dynamic looking up or dynamic binding may be unnecessary. That is, speed and efficiency may be significantly increased.

Both the model access interface and generic access interface may be necessary for providing and updating services of service implementation layer 302. For example, when a new service (i.e., a service to be added or an update to an existing service) is implemented in an original software product, client applications may use model access interface or interfaces to quickly access the new service. Further, when a new service is later added to an existing software product, client applications may immediately start accessing the new service via a generic access interface or interfaces without changing the client applications. Model access interface may be later developed and deployed in the client applications to improve the access efficiency of the applications.

Further, meta-models of the new service or services, such as new interfaces, new properties, etc., may be added to service repository 308 by using any appropriate type of repository configuration tool. The updated repository 308 may respond to inquiries from a service consumer regarding the new service or services.

The client applications (e.g., enterprise applications 310, web applications 312, etc.) and model access and generic access layer may be implemented by a service consumer or multiple service consumers (e.g., consumer 108). Model access and generic access proxy layer 316 may access service layer 320 of a service provider via access layer 318.

Access layer 318 may include any appropriate type of software programs providing communication and/or other supporting, functions according to a particular standard, such as distributed component object model (DCOM) available from Microsoft Corporation (Redmond, Wash.), simple object access protocol (SOAP), common object request broker architecture (CORBA™) available from Object Management Group, Inc. (Needham, Mass.), JINI™ network architecture available from Sun Microsystems, Inc. (Santa Clara, Calif.), remote procedure call (RPC), remote method invocation (RMI), etc. Access layer 318 may be implemented by both a service provider (e.g., provider 106) and a service consumer (e.g., consumer 108) to exchange information between the service provider and the service consumer.

In certain situations, for example, where the service provider and the service consumer are implemented on a same computer, access layer 318 may also include a direct method invocation (DMI) interface to allow the service consumer to directly access the services provided by the service provider. In certain embodiments, the direct access may be implemented as a software function call.

Figure 4:
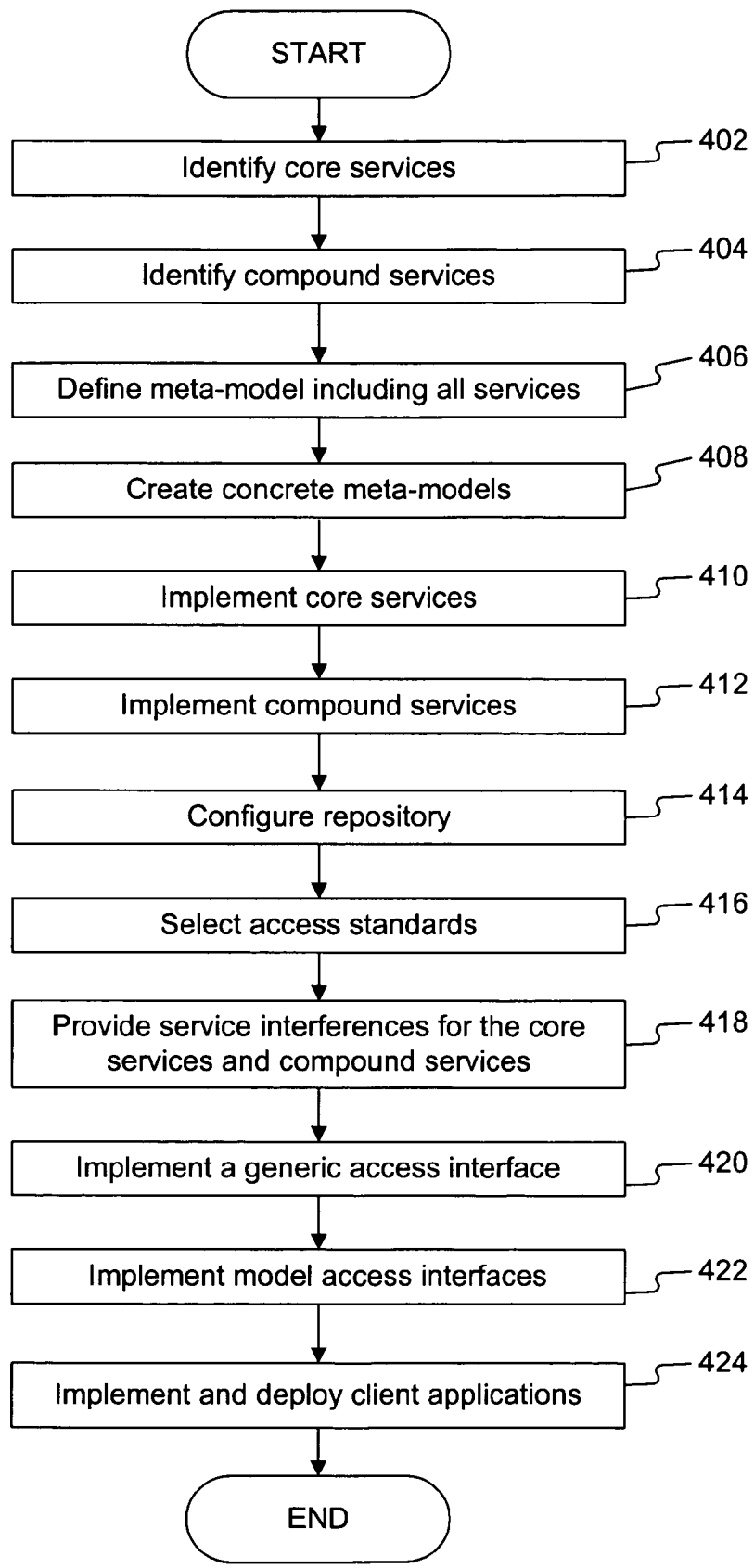
FIG. 4 illustrates a flowchart of an exemplary creation process consistent with certain disclosed embodiments.

The creation and/or operation of software frameworks or software programs according to software architecture 300 may be carried out by one or more computer systems, such as computer system 200. FIG. 4 shows an exemplary software creation process that may be performed by computer system 200, and/or a user of computer system 200, and more specifically, by processor 202 consistent with certain disclosed embodiments.

As shown in FIG. 4, processor 202 may identify one or more core services to be provided in software architecture 300(step 402). Processor 202 may identify and/or document all services to be provided and all interfaces of the services to be supported. Processor 202 may also identify compound services to be provided in software architecture 300(step 404). In doing so, processor 202 may also provide all the interfaces of the identified compound services.

Further, processor 202 may define a unified meta-model that provides a complete description of the identified core services and the compound services (step 406). The unified meta-model may include a complete list of the interfaces of both the core services and the compound services, as explained previously. After the unified meta-model is defined, processor 202 may create one or more models or concrete meta-models describing the core services and compound services (step 408). The models may be reused whenever new services are to be added.

Based on the models, processor 202 may implement one or more core services (e.g., core service 304) for a service provider (e.g., provider 106) (step 410). Processor 202 may also implement one or more compound services (e.g., compound service 306) for the service provider (step 412). The core services and the compound services may be implemented in different software structures or programming languages. Further, processor 202 may also incorporate any third party software programs providing certain core services and/or certain compound services.

The various concrete meta-models or models may be stored in a model repository. Processor 202 may create and/or configure the repository to store the unified meta-model, the concrete meta-models, and any metadata or other relevant data in the repository (step 414). Processor 202 may configure the repository using any appropriate type of configuration tool. Further, processor 202 may implement other functionalities of the repository such that the repository may be accessed by any service consumer to locate and access services.

Further, processor 202 may select access standards (e.g., access layer 318) for accessing services (e.g., core service 304 and compound service 306, etc.) (step 416). Processor 202 may select the access standards based on the software platform, programming language, operational environment, etc., of the services. More than one standard may be supported simultaneously.

Processor 202 may also provide service interfaces (e.g., service layer 320) for the core services and the compound services (step 418). Processor 202 may implement the service interfaces independent of the particular core services and compound services to, for example, reduce or eliminate efforts when updating and/or adding new core services and/or compound services.

Processor 202 may also implement client software frameworks to access the core services and the compound services. Further, processor 202 may implement a generic access interface to access the core services and the compound services (step 420). Processor 202 may implement the generic access interface independent from any particular core service and/or compound service such that the generic access interface may be used to access any core service and/or compound service based models under the unified meta-model. Particular types, interfaces, and/or operations of a service to be accessed may be passed to the generic access interface in run-time to access the services dynamically.

Processor 202 may also implement model access interfaces to access a particular service specific meta-model implementation (step 422). The model access interfaces may be implemented based on concrete meta-model objects that are corresponding to a particular service of the core service and/or the compound services. Further, processor 202 may implement and deploy client applications that use the model access interfaces and/or the generic interfaces (step 424). Users of the client applications may access the core services, the compound services, or both, via the model access interfaces and/or the generic interfaces.

Figure 5:
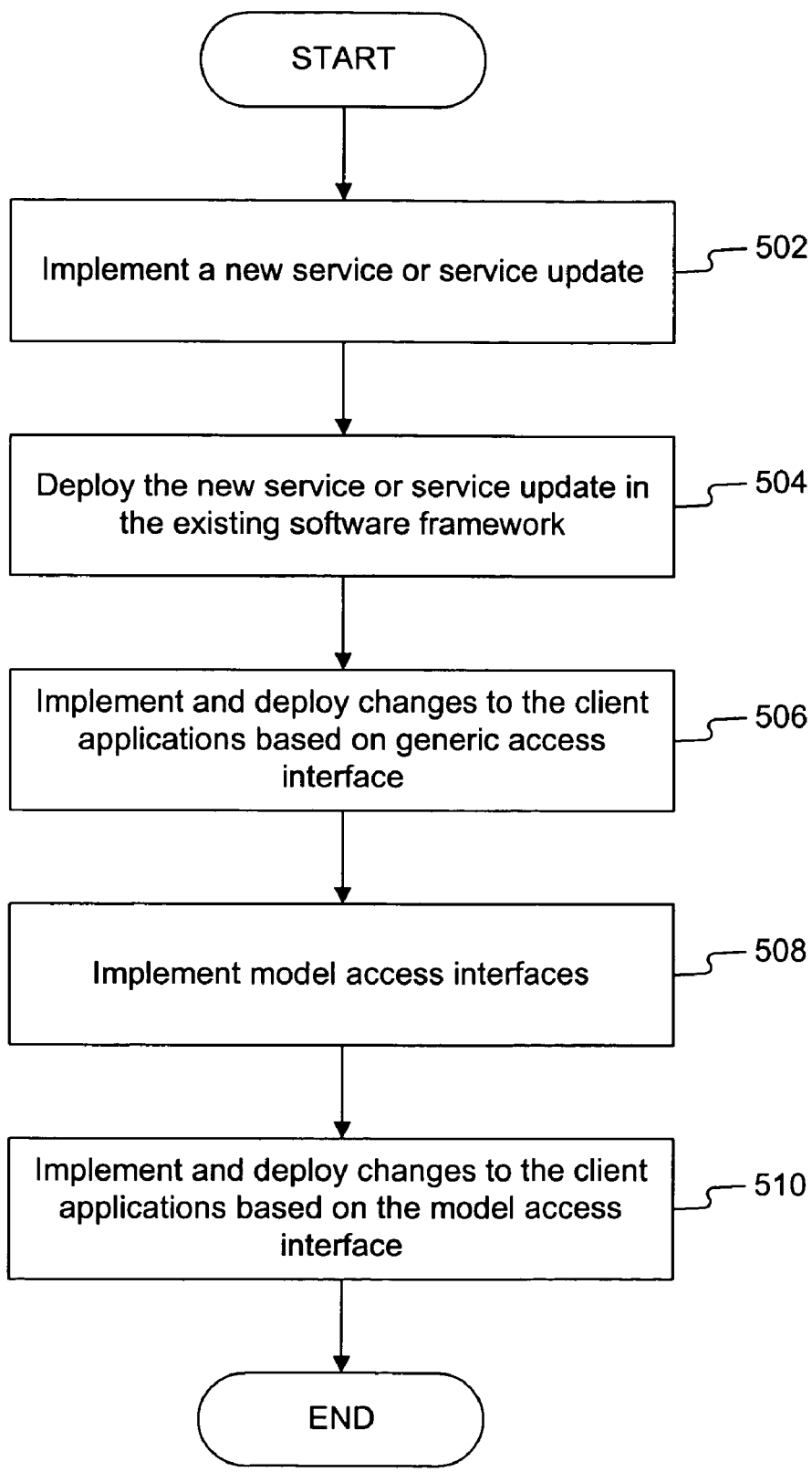
FIG. 5 illustrates a flowchart of an exemplary upgrading process consistent with certain disclosed embodiments.

After the creation of the software frameworks or software programs, the software frameworks or software programs may be deployed by users of the software frameworks or software programs on a service provider. Further, new services may be added to the existing or deployed core services and/or compound services, and the existing services may be updated. FIG. 5 shows an exemplary upgrading process for adding a new service or updating an existing service.

As shown in FIG. 5, processor 202 may implement a new service or a service update (step 502). The new service or service update may be based on new models with descriptions under the unified meta-model. However, if interfaces of the new service or service update is not completely included in the pre-defined meta-model, the new interfaces may be added to the meta-model and the repository (e.g., service repository 308) may also be updated. Updating the repository may be performed by configuring the repository using certain configuration tools as explained above.

Processor 202 may deploy the new service or service update in the existing software framework or software programs (step 504). That is, the new service may be added to the back-end service implementation layer 302 to be available for access. On the other hand, processor 202 may also implement and deploy changes to existing client applications for the new service or the service update based on the generic access interface (step 506). Because the generic access interface may be independent from a particular type of core service or compound service, the changes to the existing client applications may be minimum or none. The new service or service update may be accessed after a time period significantly less than the time period required by regular software change or upgrading using the generic access interface.

While the services may be accessed by updated client applications through the generic access interface, processor 202 may also implement a model access interface to provide more specific access to the new service or service update (step 508). Although the model access interface may take more time and efforts to implement as compared to the generic access interface, the speed and efficiency of the access may be substantially improved.

After the model access interface is implemented, processor 202 may implement and deploy changes to the client applications based on the model access interface (step 510). Because more effort may be required to implement and deploy changes to the client applications based on the model access interface as compared to the generic access interface, it may take longer before the client applications can access the services. However, the services may be accessed first by the generic access interface while the model access interface is being implemented. Thus, the services may later be accessed by the model access interface.

Figure 6:
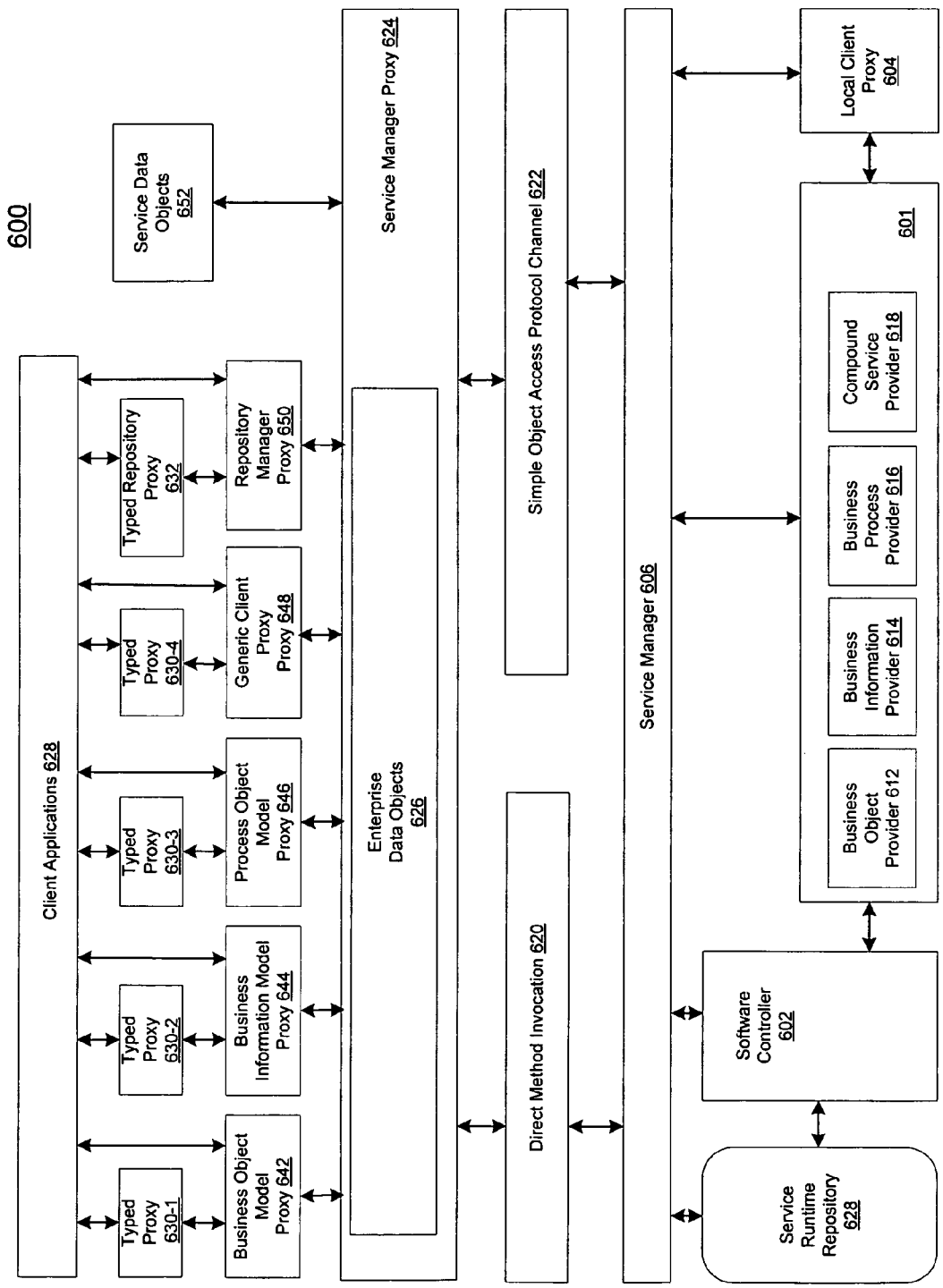
FIG. 6 illustrates a block diagram of another exemplary software architecture consistent with certain disclosed embodiments.

FIG. 6 shows an exemplary software architecture 600 with more details for providing and accessing service during runtime consistent with software architecture 300. Software architecture 600 may include service implementation layer 601 (e.g., service implementation layer 302), a software controller 602, a service runtime repository 608 (e.g., service repository 308), a local client proxy 604, and a service manager 606 (e.g., service layer 320). Software architecture 600 may also include client applications 628, typed proxies 630-1 to 630-4, a typed repository proxy 632, a business object model proxy 642, a business information model proxy 644, a process object model proxy 646, a generic client proxy 648, and a repository manager proxy 650.

A proxy may be generally referred to as a software agent that performs a certain function or functions and/or a certain operation or operations on behalf of another application or computer system while not showing the details involved in the another application or computer system. For example, business object model proxy 642 may correspond to services of a business object model defined under the unified meta-model.

Further, software architecture 600 may also include a service manager proxy 624, enterprise data objects 626, direct method invocation (DMI) 620, and simple object access protocol (SOAP) channel 622, etc. Those skilled in the art will recognize that the components listed are exemplary only and not intended to be limiting, as other components and/or different numbers of components may be implemented by software architecture 600.

A meta-model (e.g., the unified meta-model) including complete descriptions on the compound services and the core services provided by business object provider 612, business information provider 614, business process provider 616, and compound service provider 618 may be defined. Service implementation layer 601 may include a business object provider 612, a business information provider 614, a business process provider 616, and a compound service provider 618. Business object provider 612, business information provider 614, and business process provider 616 may provide various core services.

More particularly, business object provider 612 may provide core services based on concrete meta-model descriptions of business transactions; business information provider 614 may provide core services based on concrete meta-models describing business warehouse (e.g., database warehouse) and online analytical processing (OLAP); and business process provider 616 may provide core services base on concrete meta-models describing business activities designed to produce a specific output for a particular customer or market across time and space within an organization.

The defined meta-model, concrete meta-models, and relevant meta-data may be stored in service runtime repository 608 (e.g., repository 308) and may be accessed during runtime. The services and service runtime repository 608 may be accessed via service manager 606 (e.g., service layer 320).

Further, software controller 602 may coordinate interactions between the service providers (e.g., business object provider 612, business information provider 614, business process provider 616, and compound service provider 618), service manager 606, and service runtime repository 608. For example, software controller 602 may provide certain service handlers and/or web service utilities such as naming and directory services to facilitate accesses to the service providers and/or service repository 608. Software controller 602 may also provide unified message handlings, connection channel notifications, and/or dynamically property handlings, etc.

Client applications 628 (e.g., enterprise applications 310, web applications 312, other applications 314, etc.) may access a service provider via different interfaces. For example, client applications 628 may access the service providers using generic client proxy 648 (e.g., the generic access interface) directly or using generic client proxy 648 via typed proxy 630-4. Client applications 628 may also access the service providers using business object model proxy 642, business information model proxy 644, or process object model proxy 646, or using business object model proxy 642, business information model proxy 644, or process object model proxy 646 via typed proxy 630-1, typed proxy 630-2, or typed proxy 630-3, respectively.

Generic client proxy 648 may provide a generic access interface for accessing services provided by service implementation layer 601. To use the generic access interface provided by generic client proxy 648, information such as corresponding concrete meta-models and/or metadata may be obtained by client application 628 via repository manager proxy 650 from service runtime repository 608. Other repository services, however, may also be used by generic client proxy 648.

Business object model proxy 642, business information model proxy 644, or process object model proxy 646 may provide model access interfaces for accessing services corresponding to business object provider 612, business information provider 614, or business process provider 616, respectively. The various model proxies may include specific interfaces, properties, and/or operations for a particular type of core service provided by corresponding service providers, or corresponding concrete meta-models.

The typed proxies (e.g., typed proxies 630-1 to 630-4 and typed repository proxy 632, etc.) may provide a type-checked invocation of the corresponding proxies (e.g., business object model proxy 642, business information model proxy 644, process object model proxy 646, generic client proxy 648, and repository manager proxy 650, etc.). The type checking provided by the typed proxies may ensure the syntax of any invocation of the corresponding proxies as correct to reduce runtime compiling errors and/or other types of runtime errors.

Further, the proxies may access the service providers via service manager proxy 624. Service manger proxy 624 may include functional interfaces or method invocation interfaces to provide connections to the service providers through service manager 606. Service manager proxy 624 may also include enterprise data objects 626 to provide data containers that are common to some or all proxies. Service manager proxy 624 may provide connections to service manager 606 via direct method invocation 620 or simple object access protocol (SOAP) channels (e.g., access layer 318, etc.). Other middleware standards may also be used.

When direct method invocation 620 is used, such as when means client applications 628 is on the same computer platform as the service providers, local client proxy 604 may be used to handle method invocations (or function calls) instead of message processing for other types of accesses. In addition, service manager proxy 624 may also support service data objects (SDO) 652 such that third party applications conforming to the SDO standard may access the service providers via service manager proxy 624.

Figure 7:
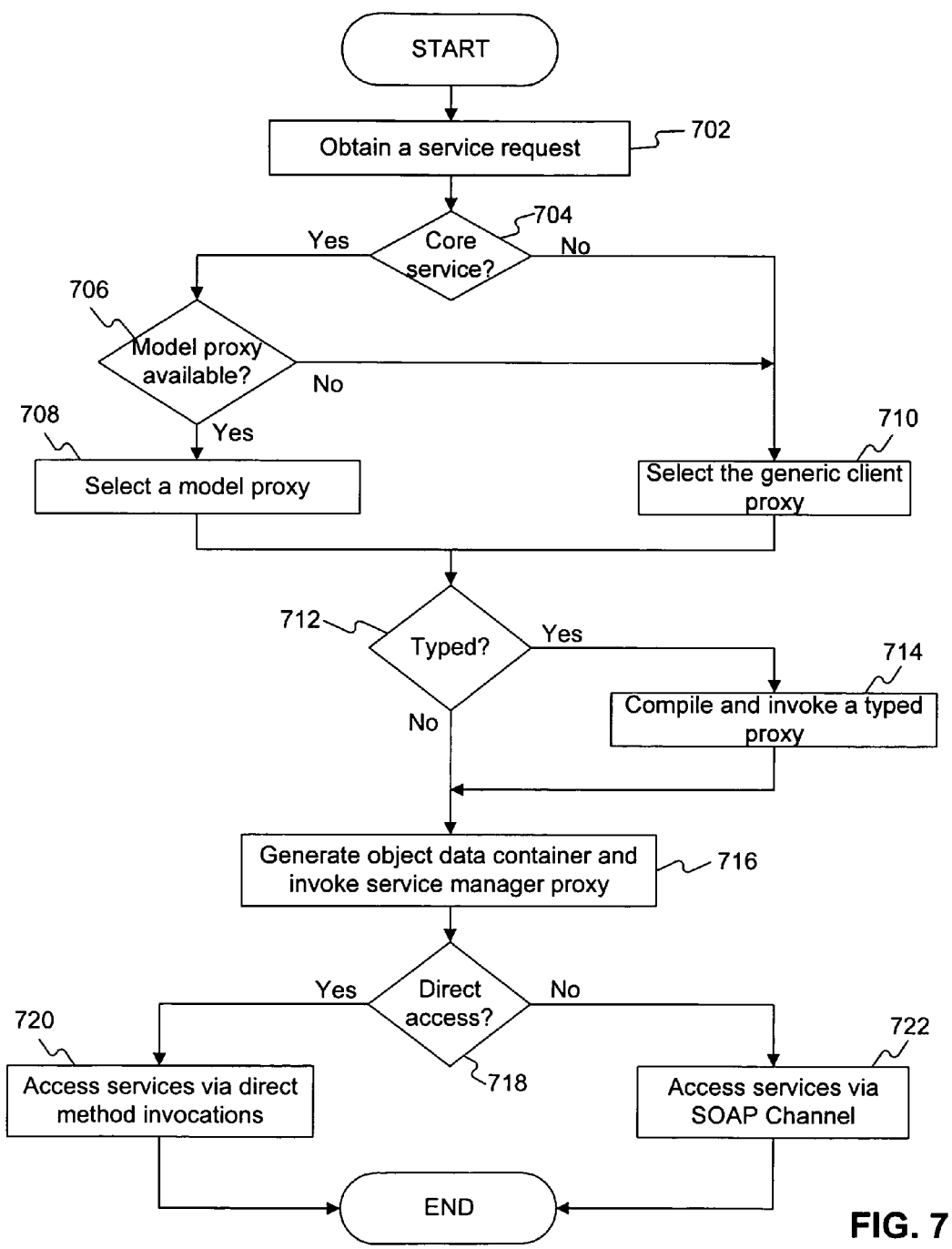
FIG. 7 illustrates a flowchart of an exemplary operational process consistent with certain disclosed embodiments.

Creating and/or updating software frameworks according to software architecture 600 may be carried out in a similar manner to the software frameworks or programs according to software architecture 300. Operational processes of the client applications according to software architecture 600 may include more detailed operations. FIG. 7 shows an exemplary client application operational process that may be performed by computer system 200 and more specifically, by processor 202.

As shown in FIG. 7, at the beginning of the client application operational process, processor 202 may obtain a service request (step 702). Processor 202 may obtain a service request when a user of client applications 628 invokes certain programs of client applications 628, or when requested by any other software programs. After obtaining the service request (step 702), processor 202 may determine whether the service requested is a core service or compound service (step 704). If processor 702 determines that the service requested is a compound service (step 704; no), processor 202 may select generic client proxy 650 (step 710).

On the other hand, if processor 202 determines that the service requested is a core service (step 704; yes), processor 202 may further determine whether a corresponding model proxy (e.g., business object model proxy 642, business information model proxy 644, or process object model proxy 646, etc.) is available (step 706). If the corresponding model proxy is not available (step 706; no), processor 202 may also select the generic client proxy (step 710). However, if the corresponding model proxy is available (step 706; yes), processor 202 may select the available model proxy for accessing the requested core service (step 708).

Further, processor 202 may determine whether typed access is requested (step 712). If typed access is requested (step 712; yes), processor 202 may compile and/or invoke a corresponding typed proxy, such as typed proxies 630-1 to 630-4 and typed repository proxy 632, etc., for selected model proxy or generic client proxy (step 714). Processor 202 may also report any compiling error during the typed access. If type access is not requested (step 712; no) or after the corresponding typed proxy is compiled without error (step 714), processor 202 may generate enterprise data objects 626 as a data container used for the service requested and may invoke service manager proxy 624 (step 716) to access the service requested.

Processor 202 may also determine whether the request access is a direct or local access (step 718). If the requested access is a direct or local access (step 718; yes), processor 202 may access the service requested via direct method invocation (step 720). On the other hand, if the requested access is not a direct or local access (step 718; no), processor 202 may access the service requested via SOAP channel 622. Other connections, however, may also be used. The service providers may receive the service requested and, as previously explained, send a corresponding service response to client applications 628 using the access methodologies disclosed above, but in reverse order (e.g., direct invocation method 620 or SOAP channel 622, service manager proxy 624, etc.).

By using both model access interfaces (e.g., the model proxies such as business object model proxy 642, business information model proxy 644, process object model proxy 646, or repository manager proxy 650, etc.) and generic access interfaces (e.g., generic client proxy 648, etc.), client applications 628 may be able to flexibly access both core services and compound services within the same software framework. Further, a new service or an update of an existing service may be provided through the generic access interfaces to significantly reduce time to market and/or the amount of implementation efforts, while a more sophisticated and more specific solution may be offered later on the new service or service update to increase speed and/or efficiency of the software framework.

Accordingly, a user or software process may use the unified meta-model to define both core services and compound services on the service providers and may also use client software applications to access the core services and the compound services through a common software framework or architecture. Models of the core services and the compound services may be reused within an enterprise to provide tested solutions. Third party software components may also be integrated by using common standards.

Other embodiments, features, aspects, and principles of the disclosed exemplary methods and systems will be apparent to those skilled in the art and may be implemented in various environments and systems. For example, third party software application developers may be able to adapt the disclosed software architectures to create software programs utilizing both core services and compound services in web service applications, or create client software applications to work with the disclosed service provider architecture, etc.

What is claimed is:

1. A method comprising:
defining, at service provider computer system comprising at least one processor, a meta-model describing at least a core service and a compound service, the core service supporting a fine granularity of operations that allows single operation manipulation of as little as one attribute of a requested service without accessing other attributes of the service, and the compound service supporting a large granularity of operations that allows single operation manipulation of all attributes or a set of attributes but is prevented from individually accessing the attributes of the service;
creating a model for the core service based on the meta-model, the model providing a service-specific model access interface corresponding to the core service;
implementing the core service on the service provider computer system based on the model;
implementing the compound service on the service provider;
providing, at the service provider computer system, a generic access interface on the service provider computer to provide, for the service consumer, access to the compound service and to a second core service for which no model has been created;
implementing a new core service on the service provider computer system; and
configuring a repository storing the meta-data on the service provider computer system to make the new core service available to the service consumer.

2. The method according to claim 1, further comprising:
deploying a first client application to the service consumer to access the service provider for at least one of the core service and the compound service.

3. The method according to claim 1, further comprising:
providing initial access to the new core service via the generic access interface.

4. The method according to claim 3, further comprising:
creating a new model that provides a new service-specific model access interface corresponding to the new core service.

5. A method comprising:
obtaining a service request by a service consumer at a service provider computer system that comprises one or more processors;

determining whether the service request is for a core service or a compound service provided by the service provider computer system, and further determining, if the service request is for the core service, whether the service provider computer system comprises a model access interface specific to the core service; and selecting the model access interface as a selected access interface to fulfill the service request to the service consumer by the service provider computer system if the service request is for the core service and if the service provider computer system comprises the model access interface specific to the core service;

performing a type check on the selected access interface; and generating a data container at the service provider computer system to provide runtime memory space for the service request and the selected access interface.

6. The method according to claim 5, further including:
selecting a generic access interface that the service provider computer system comprises as the selected access interface to fulfill the service request to the service consumer by the service provider computer system if the service request is for the compound service or if the service request is for the core service and the service provider computer system does not comprise the model access interface specific to the core service.

7. The method according to claim 5, further including:
determining whether the service consumer is on the service provider computer system; and
invoking the selected access interface via a direct method invocation method if the service consumer is on the service provider computer system.

8. The method according to claim 7, further including:
accessing the selected access interface via a small object access protocol (SOAP) channel between the service consumer and the service provider if the service consumer is not on the service provider computer system.

9. A system, comprising:
a service provider computer system configured to provide at least a core service and a compound service, the core service supporting a fine granularity of operations that allows single operation manipulation of as little as one attribute of a requested service without accessing other attributes of the service, and the compound service supporting a large granularity of operations that allows single operation manipulation of all attributes or a set of attributes but is prevented from individually accessing the attributes of the service;
one or more computer network connections configured to couple the service provider computer system to one or more service consumer computer systems, wherein the service provider computer system further includes a processor that performs functions comprising:
creating a model for the core service based on a meta-model describing the core service and the compound service, the model providing a service-specific model access interface corresponding to the core service,
implementing the core service on the service provider based on the model,
implementing the compound service on the service provider,
storing the meta-model in a repository on the first computer,
providing a generic access interface on the service provider computer system to provide, to at least one of the one or more service consumer computer systems, access to the compound service and to a second core service for which no model has been created;
implementing a new core service on the first computer; and
configuring the repository to make the new core service available.

10. The system according to claim 9, wherein the service provider computer system provides initial access to the new core service via the generic access interface.

11. The system according to claim 10, wherein operations further comprise:
creating a new model that provides a new service-specific model access interface corresponding to the new core service.

12. An article comprising computer-readable storage medium storing computer-executable instructions that, when executed by one or more processors, cause the one or more processors to performing operations comprising:
obtaining a service request by a service consumer at a service provider computer system that comprises one or more processors;
determining whether the service request is for a core service or a compound service provided by the service provider computer system, and further determining, if the service request is for the core service, whether the service provider computer system comprises a model access interface specific to the core service;
selecting the model access interface as a selected access interface to fulfill the service request to the service consumer by the service provider computer system if the service request is for the core service and if the service provider computer system comprises the model access interface specific to the core service
performing a type check on the selected access interface; and
generating a data container at the service provider computer system to provide runtime memory space for the service request and the selected access interface.

13. The computer-readable storage medium according to claim 12, wherein the operations further comprise:
selecting a generic access interface that the service provider computer system comprises as the selected access interface to fulfill the service request to the service consumer by the service provider computer system if the service request is for the compound service or if the service request is for the core service and the service provider computer system does not comprise the model access interface specific to the core service.

14. The computer-readable storage medium according to claim 12, wherein the method further include:
determining whether the service consumer is on the service provider computer system;
invoking the selected access interface via a direct method invocation method if the service consumer is on the service provider computer system; and
accessing the selected access interface via a small object access protocol (SOAP) channel between the service consumer and the service provider if the service consumer is not on the service provider computer system.

* * * * *